United States Patent [19]
Okuno

[11] Patent Number: 5,537,843
[45] Date of Patent: Jul. 23, 1996

[54] RIB KNITTING METHOD THAT PROVIDES CROSS-OVER YARNS

[75] Inventor: Masao Okuno, Wakayama, Japan

[73] Assignee: Shima Seiki Manufacturing Ltd., Wakayama, Japan

[21] Appl. No.: 411,976

[22] Filed: Mar. 28, 1995

[30] Foreign Application Priority Data

Mar. 29, 1994 [JP] Japan ................................. 6-058777

[51] Int. Cl.⁶ ..................................................... D04B 1/00
[52] U.S. Cl. ................................. 66/64; 66/60 R; 66/200
[58] Field of Search ............................... 66/64, 172 R, 66/199, 200

[56] References Cited

U.S. PATENT DOCUMENTS

| 4,691,537 | 9/1987 | Cullen et al. ............. | 66/200 X |
| 5,257,514 | 11/1993 | Okuno .......................... | 66/64 |
| 5,259,207 | 11/1993 | Mitsumoto ................... | 66/64 |
| 5,271,249 | 12/1993 | Mitsumoto ................... | 66/60 R |
| 5,444,995 | 8/1995 | Benetton ..................... | 66/64 |

FOREIGN PATENT DOCUMENTS

| 0420482A1 | 4/1991 | European Pat. Off. . | |
| 0474983A2 | 3/1992 | European Pat. Off. . | |
| 1136383 | 12/1968 | United Kingdom ......... | 66/64 |
| 1136384 | 12/1968 | United Kingdom ......... | 66/64 |

*Primary Examiner*—John J. Calvert
*Attorney, Agent, or Firm*—Nikaido, Marmelstein, Murray & Oram

[57] ABSTRACT

The present invention relates to a rib knitting method for use with a flat knitting machine having at least one pair of front and back needle beds and a yarn feeder, and more particularly to improvements in the aesthetic appearance and durability of the side border of a rib stitch knitted parts or fabric. Using the needles [(A–H)], (a–h)] on a front-back pair of needle beds [(1), (2),]. A rib stitch knitting is carried out with no yarn feeding to the outermost needle [(I)], then the yarn is fed to needle [(I)] with the yarn feeder [(3)] being reversed, and the yarn feeder [(3)] is again reversed. The yarn feeder [(3)] is reversed once more for yarn to be fed to the needles [(A–I), (a–h)] in order.

6 Claims, 11 Drawing Sheets

3-3 movement of yarn feeder 3-4

FIG. 9 movement of yarn feeder

RIB KNITTING METHOD THAT PROVIDES CROSS-OVER YARNS

FIELD OF THE INVENTION

The present invention relates to a rib knitting method for use with a flat knitting machine having at least one pair of front and back needle beds and a yarn feeder, and more particularly to improvements in the aesthetic appearance and durability of the side border of a rib stitch knitted parts or fabric.

PRIOR ART

The rib stitch structure formed on a pair of opposed front and back needle beds is thicker than a plain stitch structures produced with only one needle bed and is superior in elasticity and shape retentivity. Accordingly, the rib stitch structure is often used for the portions of garments which are forced to stretch when worn, such as the collar of a polo shirt and the front placket of a cardigan.

Figure 11:
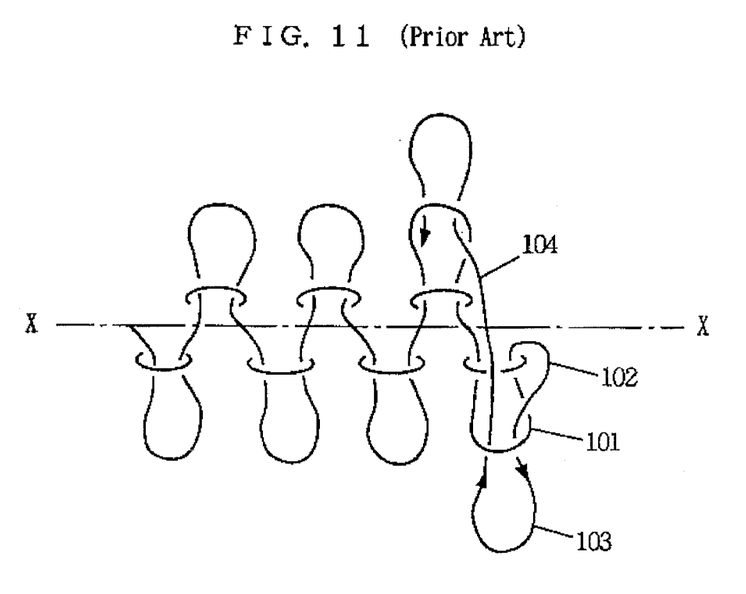
FIG. 11 is a loop chart of the side border of a rib stitch structure knitted of the prior art.

In the conventional method of rib knitting, no special treatment is made for the side borders of the rib stitch fabrics. In the direction of the side border of a fabric, to be knitted, the yarn feeder traverses to the outside of the side border, feeding yarn to needles on front and back needle beds alternately for rib knitting up to the needle for the outermost wale at the border of the fabric. Subsequently, the yarn feeder is reversed and caused to traverse the fabric inwardly thereof to feed the yarn to the needles on the front and back needle beds alternately for rib knitting from the needle for the loop of the outermost wale at the border. FIG. 11 shows the rib stitch structure thus formed.

With reference to the structure of FIG. 11, the yarn forms a loop (101) of the outermost wale in one course towards the fabric side border and then forms the next loop (103) of the same wale in the next course directed inwardly of the fabric. Since the yarn feeder reverses on the outside of the fabric and advances inwardly thereof, the cross-over yarn (102) between the loops (101) and (103) starts from the outer side of the loop (101) with respect to the fabric, turns from the upward direction to the downward direction in the drawing on the outside of the fabric, and extends vertically to the loop (103). This is because the yarn is fed in the course towards the outside of the fabric to the needle for the outermost wale and then the yarn feeder is reversed for refeeding from the same needle. The cross-over yarn (102) starts from outside of the loop (101) and moreover is reversed on the outside of the fabric. This results in outward swelling of the cross-over yarn (102) with respect to the side border of the fabric, and this swelling is noticeable on the side border of the fabric thereby to cause wavy and uneven lines on the fabric's side border. This affects the fabric's aesthetic beauty.

Assuming that the structure of the lower part of the fabric in FIG. 11 is knitted on the front needle bed and the structure of the upper part is knitted by the back needle bed, the outermost loop (103) formed in the course to inside of the fabric on the front bed is linked with the next loop formed on the back bed through a cross-over yarn (104). The cross-over yarn (104), however, runs inside of the fabric's side border (left side of the loops (101) and (103)) and not through the outside of the side border. A cross-over yarn (102) links the loops (101), (103) formed by the front needle bed; however, it does not link the loop (101) made on the front needle bed with a loop made on the back needle bed. Since there is no cross-over yarn for linking loops made on the front needle bed with loops made on the back bed on the outside of the side border, the fabric has side border insufficient in strength and also in durability. Clothes made of such fabrics are subject to become damaged from the side border of the rib stitch part, when putting on and putting off is repeated with application of force to the side border of the fabric.

Figure 12:
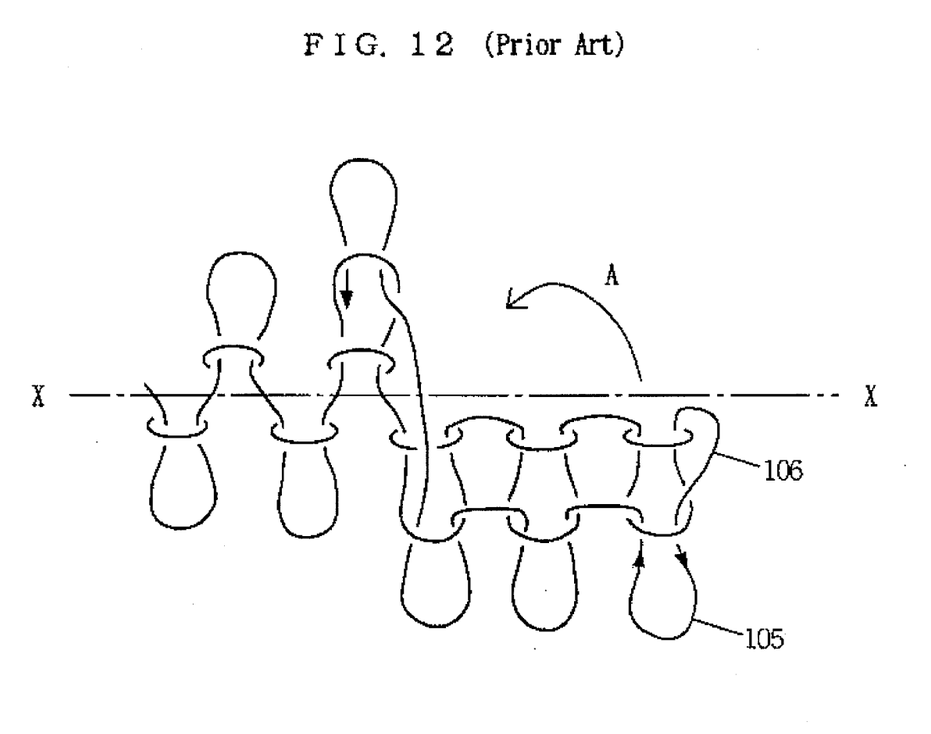
FIG. 12 is a loop chart of the side border of rib stitch structure knitted of the prior art.

For solving the problem of the aesthetic appearance being affected by swelling of the cross-over yarn (102) on the outside of the rib fabric shown in FIG. 11, a rib structure shown in FIG. 12 has been utilized. In the rib structure, the side border has several wales (3 wales in the FIG. 12) of plain stitches, and using the properties that the edges of plain stitch fabrics tend to curl towards the direction indicated by an arrow A in the figure, the loop (105), etc. of the side border are made so as to be curled towards the A direction so as to prevent the cross-over yarn (106) from swelling on the side border. In this method, however, the side border part consists of a plain stitch structure, and the strength of this part is still insufficient.

SUMMARY OF THE INVENTION

The objects of the present invention are as the following:

1) to prevent cross-over yarns from swelling on the outside of the rib stitch part's side border so as to ensure the side border against becoming wavy and uneven, and 2) to provide cross-over yarn for connecting the loops made on the front needle bed with those made on the back needle bed on the outside of rib stitch part's side border thereby to reinforce the side border.

As a supplement to the reinforcement of the fabric's side border, cross-over yarn connecting loops made on the front needle bed with those made on the back needle bed should not be reversed half-way lest the cross-over yarn should swell on the outside of the rib stitch fabric. Thus, the reinforcement of the side border and improvement of the aesthetic appearance are both attainable without contradiction.

The present invention comprises a rib knitting method for knitting a fabric having at least one side border by feeding yarn alternately to needles (A–I, a–h) corresponding to the fabric on the opposite front and back needle beds (1, 2) of a flat knitting machine having at least one yarn feeder (3) which traverse on the needle beds (1, 2) for feeding yarn thereto and is characterized in that said rib knitting method includes:

a: a step for rib knitting, wherein moving the yarn feeder (3) from a region on the needles (A–I, a–h) corresponding to the fabric to outside thereof, and forming loops by feeding the yarn from the yarn feeder (3) to needles (A–I) corresponding to the fabric on one needle bed (1) and to needles (a–h) corresponding to the fabric on the other needle bed (2) alternately, except at least one empty needle (I), (H, I), (h), or (g, h) comprising the outermost one of the needles (A–I, a–h) corresponding to the fabric with respect to one of the needle beds (1), (2) during this movement, b: a step for moving the yarn feeder (3) from outside of the needles (A–I, a–h) corresponding to the fabric into a region thereon and for forming loops by feeding the yarn to the said empty needle (I), (H, I), (h), or (g, h) during this movement, c: a step for moving the yarn feeder (3) from the region on the needles (A–I, a–h) corresponding to the fabric to outside thereof, d: and a step for moving the yarn feeder (3) from outside of the needles (A–I, a–h) corresponding to the fabric into a region thereon, and feeding the yarn from the yarn feeder (3) to needles (A–I), (A–G), (A–F), (A–G, I) on said one needle bed (1) and to needles (a–h) on said the other needle bed (2), both corresponding to the fabric for rib knitting.

The empty needle is, preferably, the outermost needle (I) or (h) corresponding to the fabric to be knitted on either of the needle beds (1) and (2). Or preferably, the empty needles are one of the outermost needle (I) and (h), and a predetermined number of inside needles adjacent thereto (H), or (g) on the same bed also corresponding to the fabric to be knitted.

Since the two needle beds (1), (2) have their needles shifted by a half pitch, presuming that the outermost needle (I) among the needles (A–I) corresponding to the fabric on the first needle bed (1) is outside the outermost needle (h) among the needles (a–h) corresponding to the fabric on the second needle bed (2), the empty needle is preferably at least the outermost needle (I), (H, I) of the needles (A–I) corresponding to the fabric on the first needle bed (1).

Also preferably, presuming the same arrangement of the needle beds (1), (2), the empty needle is at least the outermost needle (h), (g, h) of the needles (a–h) corresponding to the fabric on the second needle bed (2), and in the step "a", the yarn is fed to the individual needles (A–I, a–g), (A–I, a–f) corresponding to the fabric except the empty needle (h), (g, h), in the step "b", the yarn is first fed to the empty needle (h), (g, h) and then, the yarn is fed to the most proximate needle (H), (G) inside of the empty needle (h), (g) on the first needle bed (1), in the step "c", the yarn is fed to the needle (I), (H, I) corresponding to the fabric to be knitted and adjacent outwardly to the said most proximate needle (H), (G) on the first needle bed (1), and in the step "d", after feeding the yarn to the empty needle (h), (g, h), rib stitch knitting is carried out with the yarn first fed to the needle (g), (f) inside of the empty needle (h), (g) on the second needle bed (2) and then fed alternately to the needles (a–f), (a–e) corresponding to the fabric on the second needle bed (2) and to the needles (A–G), (A–F) corresponding to the fabric on the first needle bed (1).

Or preferably, providing that the needle beds (1), (2) are arranged in the same way, the empty needle is at least the outermost needle (h) of the needles (a–h) corresponding to the fabric on the second needle bed (2), and in the step "a", the yarn is fed to needles (A–I, a–g) corresponding to the fabric except the empty needle (h). In the step "b", yarn-feeding is made to the empty needle (h), then on the first needle bed (1), the yarn is fed to the needle (H) nearest thereto. In the step "d", the yarn is fed to the outermost needle (I) of the needles (A–I) corresponding to the fabric to be knitted on the first needle bed (1) and to the empty needle (h), and thereafter, rib stitch knitting is carried out with the yarn first fed to the inside needle (g) on the second needle bed (2) and then fed alternately to the individual needles (a–g) corresponding to the fabric on the second needle bed (2) and to the individual needles (A–G) corresponding to the fabric on the first needle bed (1) in a zigzag fashion.

Preferably, at least two loops are formed in succession on the outermost needle and its inward needle corresponding to the fabric on the same needle bed (FIGS. 3, 5, 7, 9). The loops thus formed are, unlike other loops, different in stitch structure (FIG. 4, 6, 8, 10), the loops are pulled together, the interwale distance becomes smaller, a fashion line is formed between the loops and normal rib-knitted loops and a fine aesthetic appearance is obtained.

Front and back pairs of needle beds are arranged to be opposed to each other and each needle bed has a large number of needles at a constant pitch arranged thereon. The needle pitch is equal for the two needle beds. As is well known, needle beds are long in size, and in this specification, the direction along their large length is referred to as the side direction and the direction perpendicular to the side direction in a substantially horizontal plane is referred to as the front-back direction. Which side is front or back is here of no importance. As a rule, rib knitting is done with needles on the front and back needle beds mutually shifted half the pitch. Also in this specification, needles used in knitting, i.e. the needles forming the loops, are referred to as needles corresponding to a fabric. In the given embodiments, description is made in disregard of increase or decrease of loops, hence, the number of needles corresponding to a fabric is constant, but it is not constant when the number of loops is increased or decreased. Generally, a plurality of yarn feeders are used, however for simplicity's sake, one yarn feeder is described.

Knitting of a side border by the method of the present invention is applicable to at least one side border of a fabric. In the case of the collar of a polo shirt or the front placket of a cardigan, the upper edge of the collar or the inside edge of the front placket are of particular importance, and this invention will, as a rule, be applicable to these parts. The lower part of the collar and the outside of the front placket can be made together with a plain stitch front body, and in such a case the lower part of the collar and the outside of the front placket is not a rib stitch part.

EMBODIMENTS

Embodiments of rib knitting methods of the present invention will be described in detail with reference to the accompanied drawings. In the embodiments given, this invention is applied to the right side border of rib stitch structure, and the number of the needles shown is less than that actually used.

Figure 8:
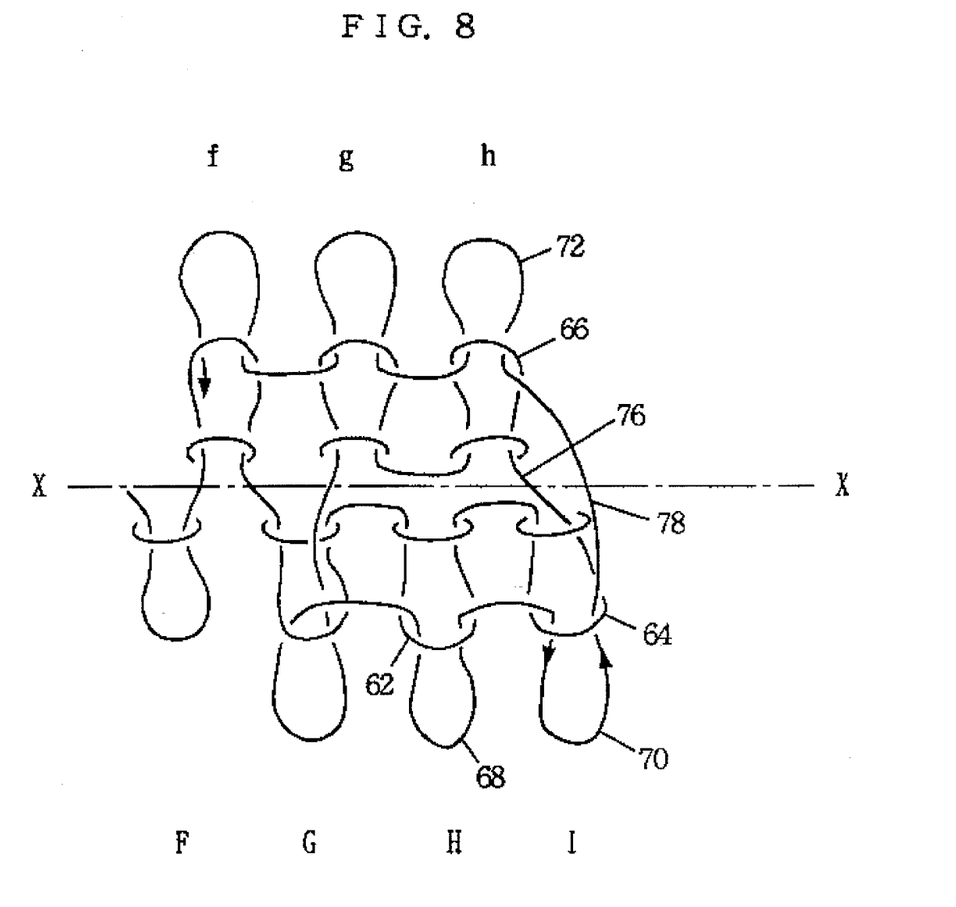
FIG. 8 is a further loop chart of the side border of rib stitch structure knitted by the variation shown in FIG. 7.
Figure 9:
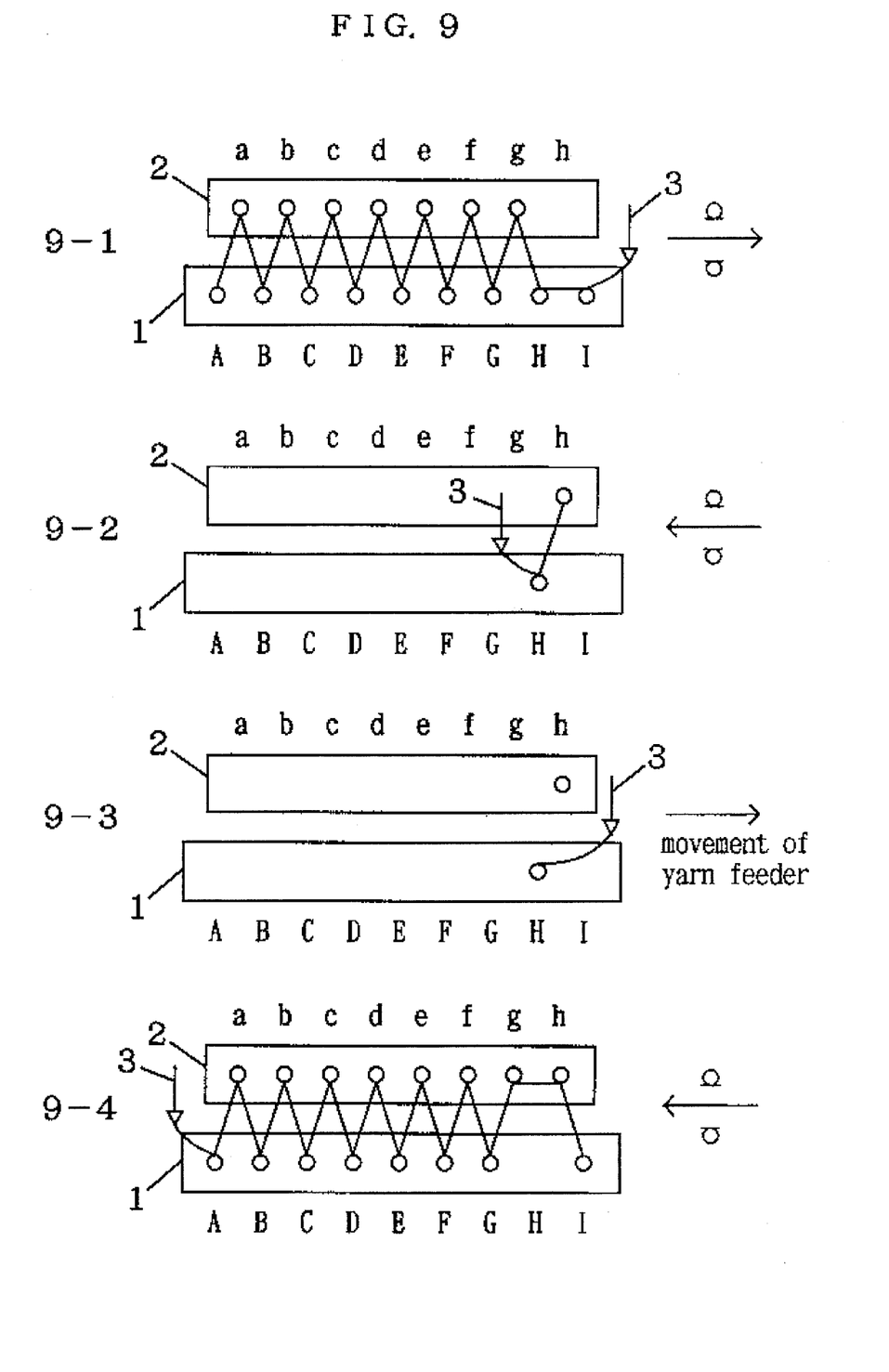
FIG. 9 shows knitting courses of the third embodiment of the invention.
Figure 10:
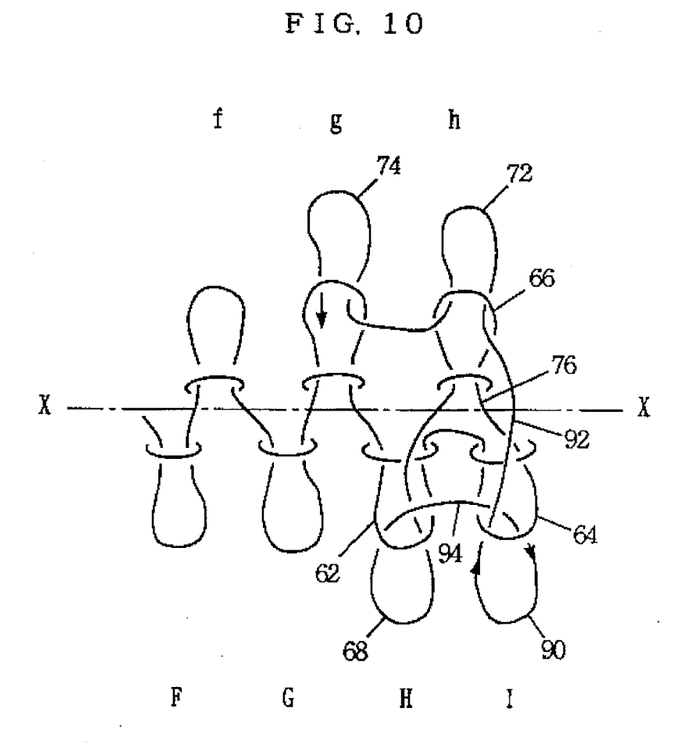
FIG. 10 is a loop chart showing the side border of rib stitch structure knitted in the embodiment shown in FIG. 9.

Rib stitch-knitting is done with the front and back needle beds shifted by half pitch to the left and right respectively, and even if the same number of needles are used on both front and back needle beds, the needles at the end of the knitting region are different by half pitch between the front and back needle beds. In the embodiments given, therefore, the outermost wale in a fabric is called the side-end border wale and the next inward wale is called the second side border wale, and other needles are referred to with these wales being standard. When attention is paid to a single needle bed, those used for the side-end border and the second side border loops are called the outermost needles in the bed. The embodiments are shown in the order of the first embodiment (FIG. 1, FIG. 2), variation thereof (FIG. 3, FIG. 4), second embodiments (FIG. 5, FIG. 6), variation (FIG. 7, FIG. 8), and the third embodiment (FIG. 9, FIG. 10). Description to the first embodiment is applicable to other embodiments and variations thereof, unless noted otherwise.

Embodiment 1

Figure 1:
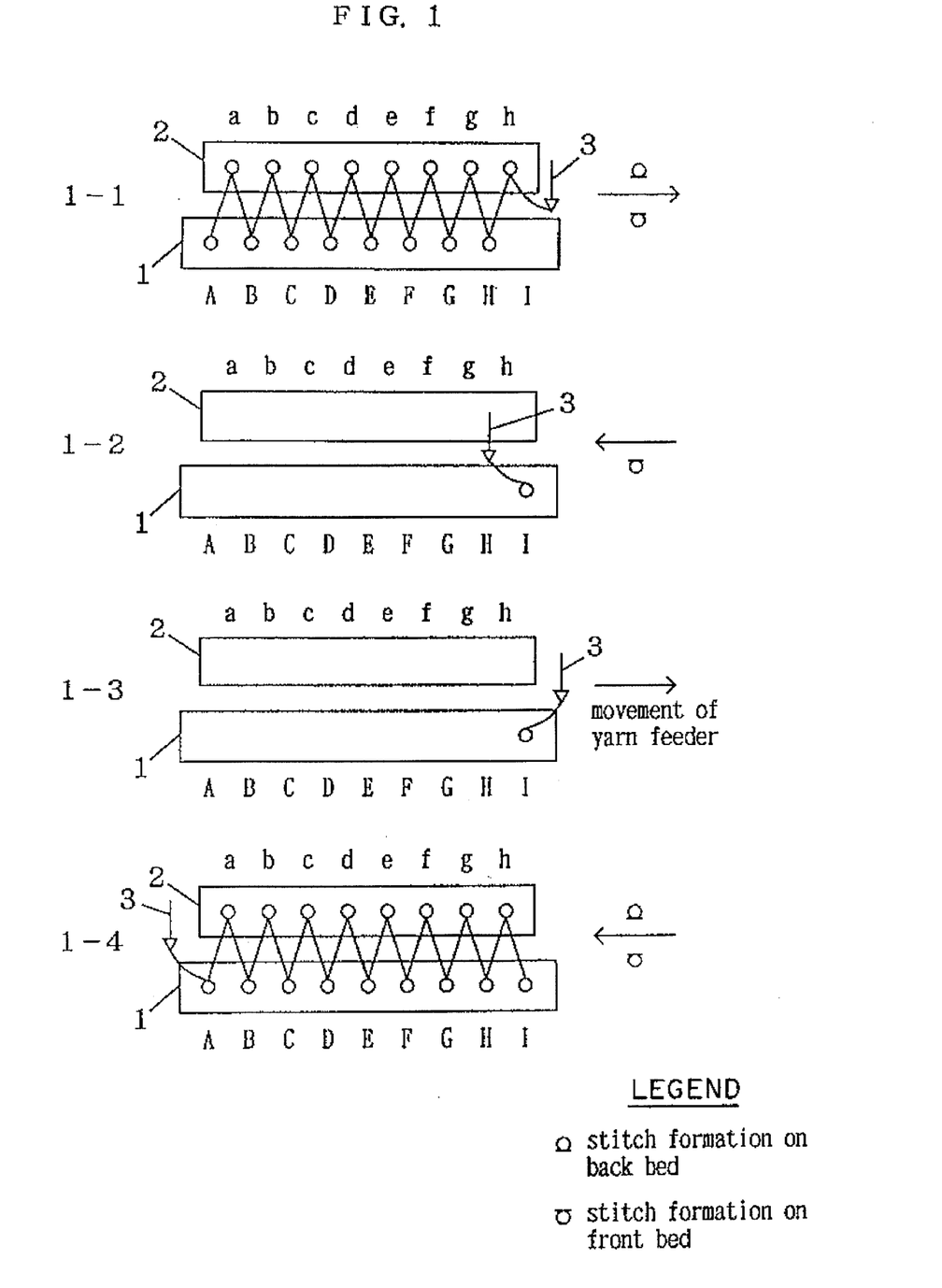
FIG. 1 shows knitting courses in the first embodiment of the present invention.
Figure 2:
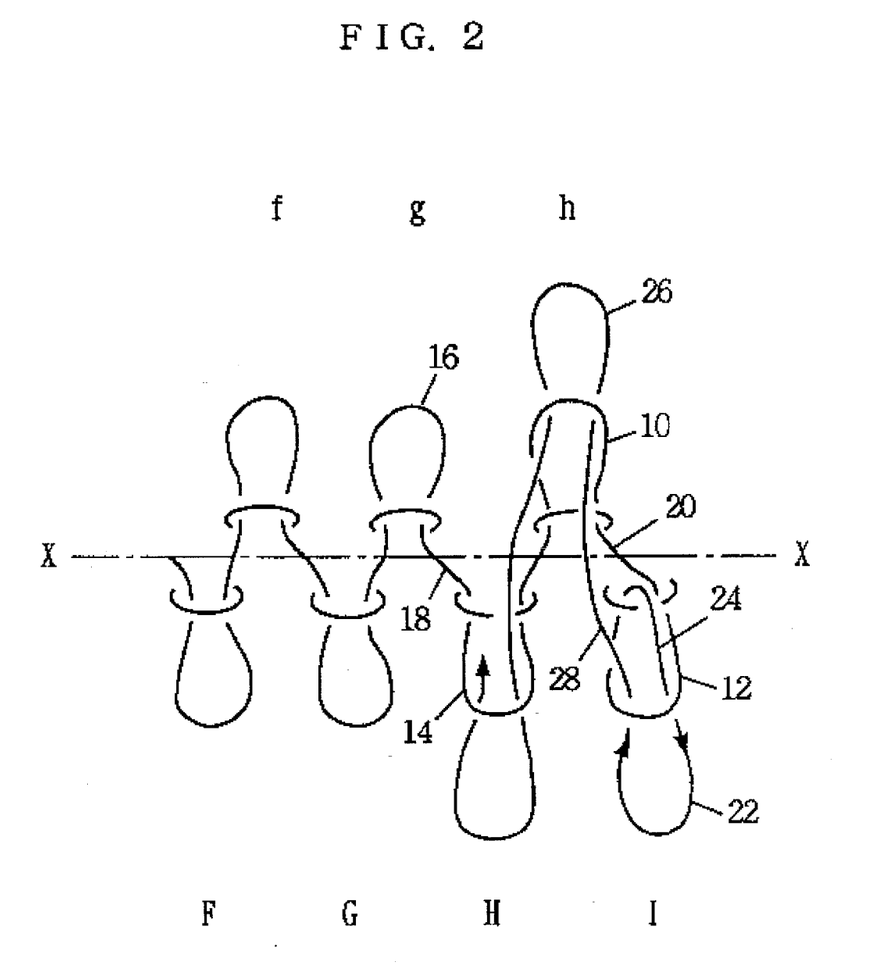
FIG. 2 is a loop chart of the side border in rib stitch structure knitted according to the embodiment shown in FIG. 1.

The knitting courses in the first embodiment is shown in FIG. 1, and the resulting side border of rib stitch fabric is shown in FIG. 2. In FIG. 1, (1) shows the front needle bed, (2) shows the back needle bed, these needle beds, front and back, are abut to each other, and the beds are long-shaped with a large number of needles studded thereon. Among the needles on the front needle bed (1), those corresponding to the fabric, i.e. those in the knitting region, are called needles (A–I), and of the needles on the back needle bed (2), those corresponding to the fabric are called needles (a–h). The number of the needles (A–I), shown in the figure, on the front needle bed (1) is 9, and there are a still large number of needles for knitting the inside part of the rib stitch structure in the left of the figure. The number of the needles (a–h), shown in the figure for the back needle bed (2), is 8, and there are a large number of other needles for knitting the interior of the rib stitch fabric in the left of the figure. The needle beds (1), (2) are not necessarily one pair; since some flat knitting machines have 4 needle beds for example, one pair thereof may be used for knitting according to the present method. In the embodiment, the needle (I) is one for the side-end border wale, and the needle (h) is one for the second side border wale. Thus, the needles (I), (h) are the outermost needles on the needle beds (1), (2) respectively, and the right border of the rib stitch structure is on the needle (I). (3) is the yarn feeder; here a single yarn feeder is shown, however a plurality of yarn feeders may be used. The arrows on the right in the figure show the movement of the yarn feeder (3) and the upper and lower symbols indicate the stitch formation by the yarn feeding. The flat knitting machine used is an ordinary V-bed machine.

In this embodiment, ordinary rib knitting is done by the first course (FIG. 1-1) from inside of the rib stitch structure (left of the figure) to the side border (right of the figure) until the needle (h) is fed, with feeding the yarn from the yarn feeder (3) to the needles (A–H) on the front needle bed and to the needles (a–h) on the back needle bed (2) for rib knitting. With the outermost needle (I) on the front bed (1) being empty, the yarn is not fed to the empty needle (I), and the yarn feeder (3) is moved to outside (right in the figure) of the knitting region (in the figure, region above the needles (A–I), (a–h)). Then the yarn feeder (3) is reversed and moved onto inside of the knitting region, and meanwhile the yarn is fed to the outermost needle (I), which was inactive during the former courses in FIG. 1-1, on the front needle bed (1) for forming a loop (FIG. 1-2). Then, the yarn feeder (3) is again reversed and made traversed to outside of the knitting region without the yarn being fed to any needle, i.e. without any loop formation, (FIG. 1-3). Then, the yarn feeder (3) is again reversed and made traversed to inside of the knitting structure, and meanwhile, the yarn is alternately fed from the yarn feeder (3) to all needles (A–I), (a–h) for rib knitting to take place (FIG. 1-4). The course shown in FIG. 1-4 is a normal rib knitting course.

The resulting rib stitch fabric is shown in FIG. 2. The X—X line in the figure shows the center line of the gap between the front and back needle beds (1) and (2), and symbols (F–I, f–h) in the figure indicate the needles used in knitting. In the course shown in FIG. 1-1 towards the side border of the knitted fabric, the yarn is not fed to the needle (I), and a loop (10) is formed by the needle (h) in the final of the course. To the needle (I), yarn is fed from right to left during the course in FIG. 1-2, and a loop (12) for side-end border wale is formed. Since the direction of the yarn feeder traverse is from right to left in FIG. 1-2 (from outside inward), the cross-over yarn (20) between the loops (10) and (12) is positioned on the right-hand side of the side-end boarder loop (12). This is in contrast to the fact that the cross-over yarn (18) for linking the loop (14) formed by the needle (H) and the loop (16) formed by the needle (g) lies on the left-hand side of the loop (14). Further, the cross-over yarn (20) is not reversed in contrast to the cross-over yarn (102) in FIG. 11. During the course in FIG. 1-3, since the yarn feeder (3) is once moved to outside of the knitting region, and then, the fabric is knitted inwardly from the needle (I) as shown in FIG. 1-4, the cross-over yarn (24) for connecting the loop (12) and the side-end border loop (22) made by the needle (I), as shown in FIG. 1-4, runs from left end of the loop (12), then reverses from upward to downward as seen from the figure, and ends on the right-hand side of the loop (22). The cross-over yarn (28) for the loop (26) formed during the course in FIG. 1-4 and the loop (22) runs from the left end of the loop (22) to right end of the loop (26), having no reversion there-between.

The cross-over yarn (20) connects loops (10), (12) on the outside of the side border of the fabric. Since the cross-over yarn (20), connecting the stitches knitted on the front needle bed (1) and stitches knitted on the back needle bed (2), appears on the outside of the fabric's side border, the loops (10) and (12) are securely connected, and the side border of the rib fabric gets stronger. Since the cross-over yarn (20) has no reversion, no outward swelling takes place, and the fabric's aesthetic appearance becomes finer. Since the cross-over yarn (24) has its reversion point within the loop (12), it does not interfere with the side border's aesthetic appearance, and the loop (22) is connected to the loop (26) formed on the opposite needle bed (2) by the cross-over yarn (28). Thus, a rib stitch side border, excellent in both aesthetic appearance and strength, is attainable.

Variation 1

Figure 3:
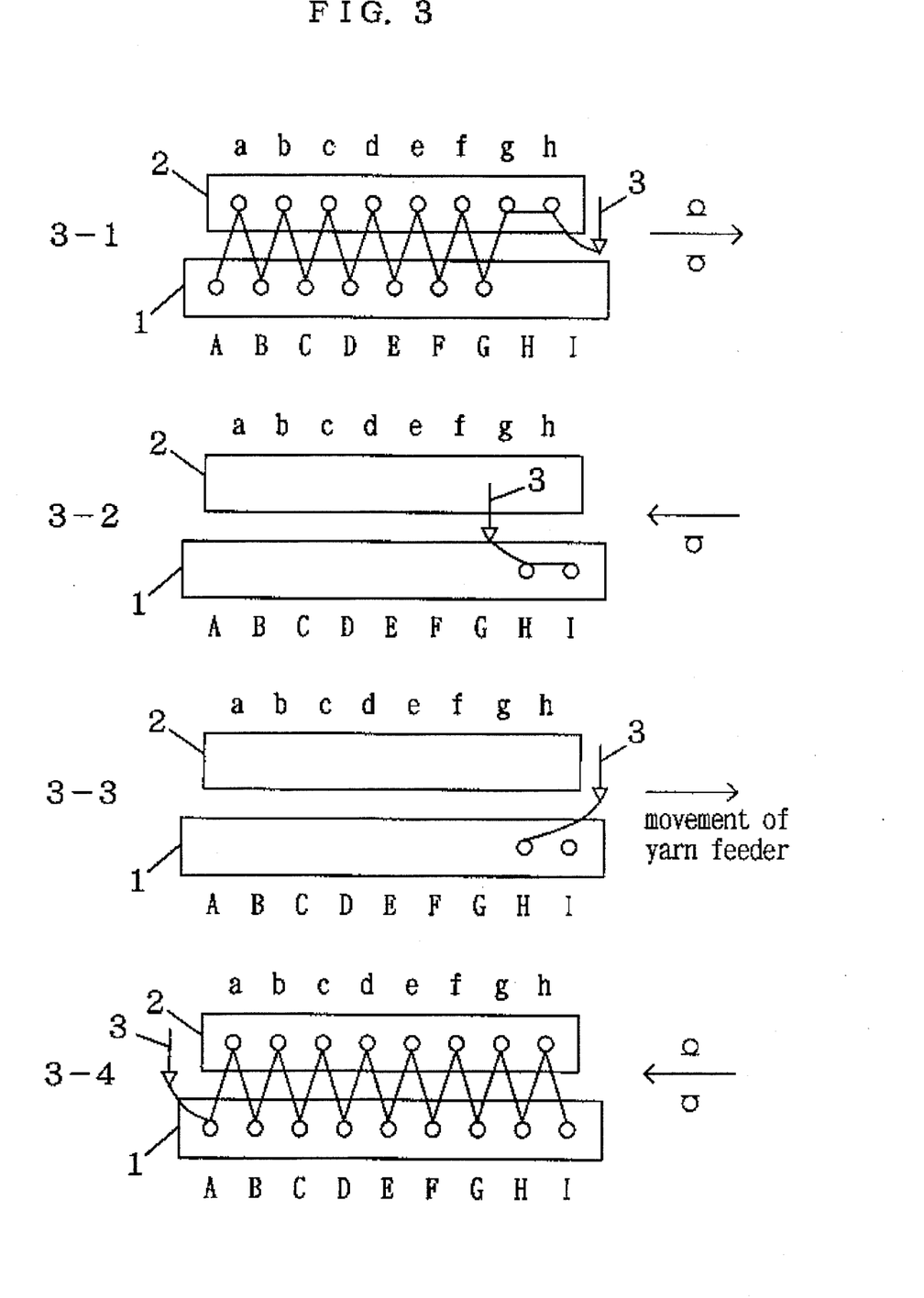
FIG. 3 shows knitting courses in a variation of the embodiment shown in FIG. 1.
Figure 4:
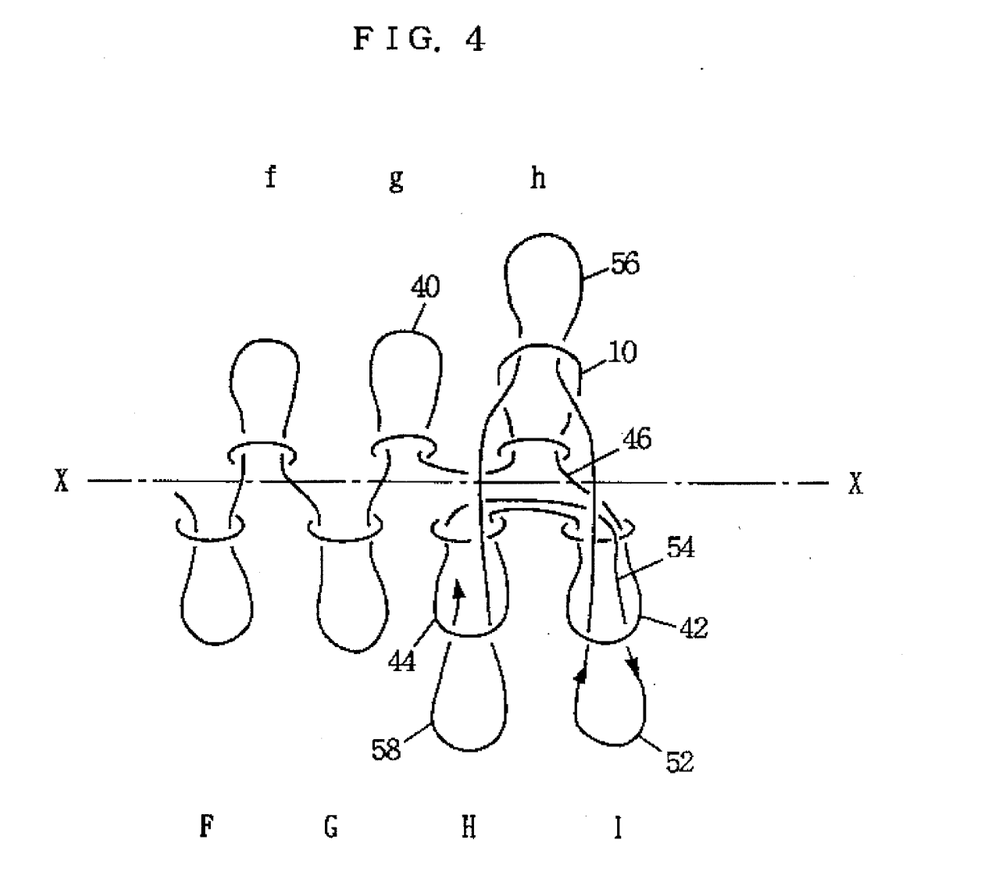
FIG. 4 is a loop chart of side border in rib stitch structure knitted with the variation shown in FIG. 3.

In the aforementioned embodiment, during the first course shown in FIG. 1-1, the needle (I) (the needle for the side-end border wale) was taken as an empty needle, and the loops were formed with yarn fed to all other needles in the knitting region. However, it is as well possible to take a given number of needles on the inside of the needle (I) on the bed (1) as empty needles such as the needle (H), or needles (G) and (H) in addition. Such a variation is shown in FIG. 3, and the resulting rib stitch fabric is shown in FIG. 4. During a course in FIG. 3-1, yarn is not fed to not only the needle (I) but also to the needle (H), and in FIG. 3-2, the yarn is fed to the needles (I) and (H). During a course in FIG. 3-3, the yarn feeder (3) is reversed and traverses to the outside of the knitted region, and during a course in FIG. 3-4, the yarn is fed from the needle (I) to individual needles on the needle beds (1) and (2) in order. The number of needles with yarn not fed thereto in FIGS. 1-1 and 3-1 is, for example, one (FIG. 1-1), two (FIG. 1-2), or several. The empty needles with no yarn fed thereto in FIGS. 1-1 or 3-1 are fed with the yarn in FIGS. 1-2 and 3-2, and during the courses shown in FIGS. 1-1 to 1-4 or FIGS. 3-1 to 3-4, the number of the loops formed is two for each of the needles (A–I), (a–h).

With respect to the rib structure shown in FIG. 4, since the yarn is fed to the needles (g, h) continuously but not to needles (H), (I) during the course in FIG. 3-1, the outermost loop (10) formed on the back needle bed (2) (knitted in FIG. 3-1) is connected to the adjacent inner loop (40) formed on the same needle bed (2) as if they were plain stitches. During the course in FIG. 3-2, loops (42), (44) are formed, and during the course in FIG. 3-4, loops (52), (56) and (58) are formed in this order. The loops (10), (42) are connected by cross-over yarn (46) which is not reversed and is passed through outside of the side border of the knitted fabric. Cross-over yarn (54) between the loops (44) and (52) is covered by the loop (42) and not visible on the outside of the side border, and no swelling is caused thereby. Since the loops (10), (40) are formed in succession on the same needle bed (2) during the course in FIG. 3-1, and the loops (42), (44) are formed on the same needle bed (1) also in succession during the course in FIG. 3-2, thus the stitch structure in these parts is different from those in other rib stitch parts, the loops (42), (44) and the loops (10), (40) pulling each other, and this results in a smaller inter-wale distance. This decreased inter-wale distance corresponding to the needles (g) and (I) gives rise to a fashion line, and the line adds to the aesthetic appearance of the fabric.

Embodiment 2

Figure 5:
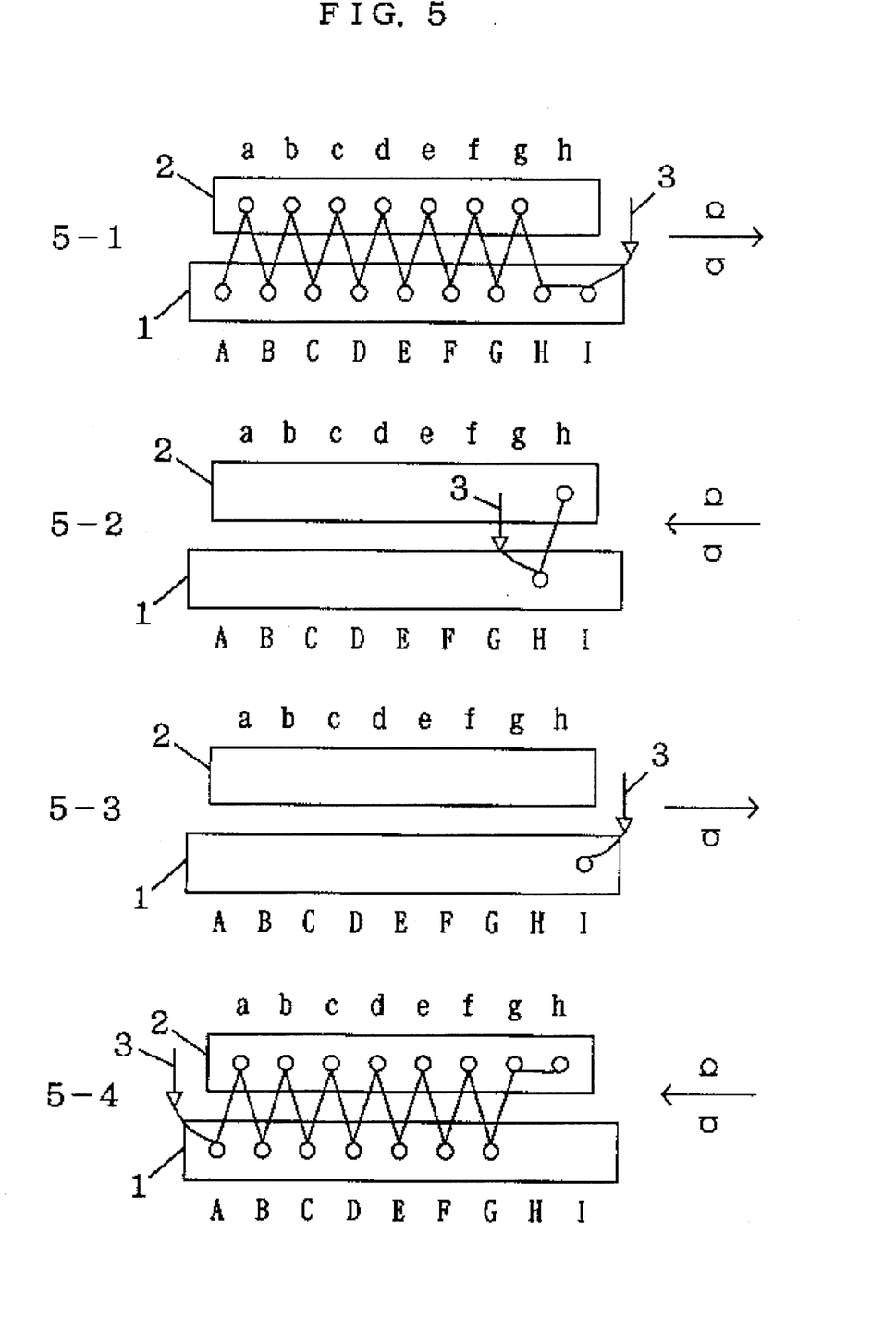
FIG. 5 shows knitting courses in the second embodiment of the invention.
Figure 6:
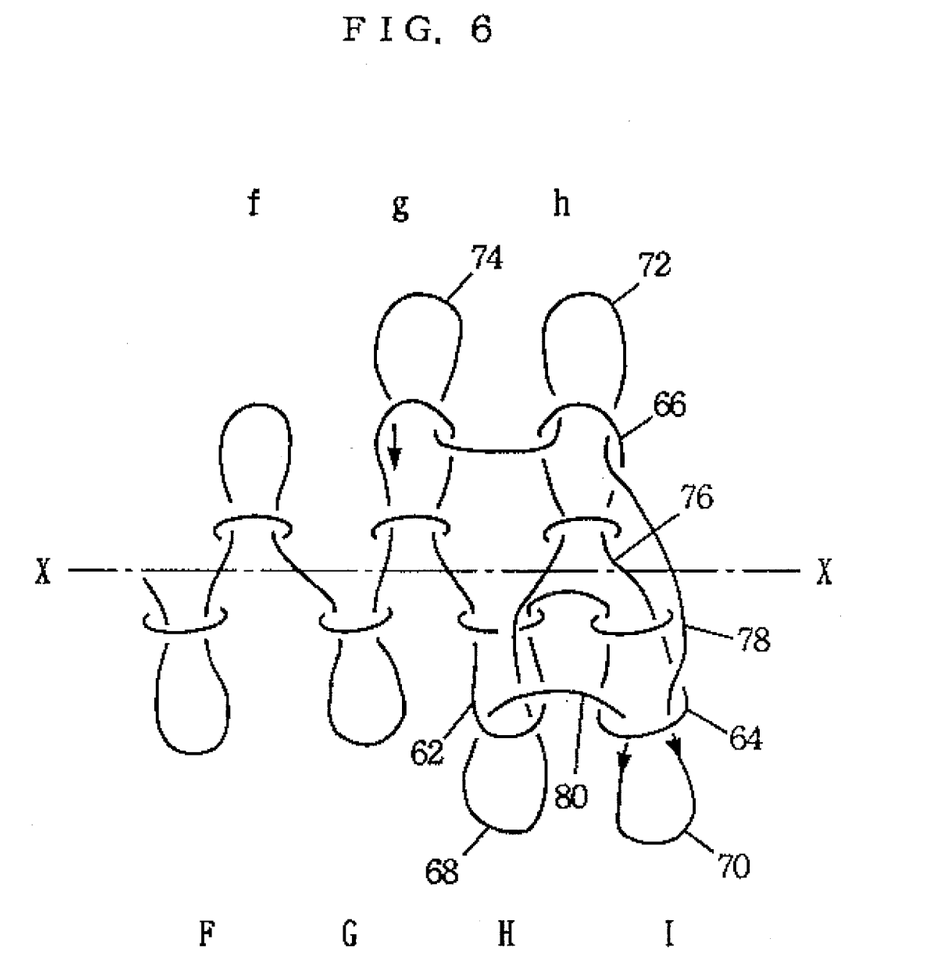
FIG. 6 is a loop chart of the side border in rib stitch structure knitted according to the embodiment shown in FIG. 5.

FIG. 5 shows the knitting courses of the second embodiment, and FIG. 6 shows the resulting rib fabric. After rib stitch knitting with yarn being fed alternately to the needles (A–H) on the f font needle bed (1) and to the needles (a–g) on the back needle bed (2), the yarn is fed to the needle (I) in succession to the needle (H) on the same needle bed (1) for loop formation (FIG. 5-1). The empty needle here is the outermost needle (h) on the back needle bed (2). Then after reversion of the yarn feeder (3), the yarn is fed to the empty needle (h) during the previous course and to the needle (H) on the front needle bed (1) nearest to and inward of the empty needle (h) (FIG. 5-2). After reversion of the yarn feeder (3) once more, the yarn is fed to the needle (I) on the front needle bed (1) for loop formation (FIG. 5-3). The yarn feeder (3) is then reversed again, and the yarn is fed to the needles (h), (g) on the back needle bed (2) for loop formation, this is followed by alternate front and back yarn feeding to the needles (G–A) on the front needle bed (1) and the needle (f–a) on the back needle bed (2) for loop formation (FIG. 5-4).

The rib stitch fabric thus knitted is shown in FIG. 6. Since the needle (h) in FIG. 5-1 is made empty, loops (62), (64) are successively formed on the needles (H), (I) on the front needle bed (1). In FIG. 5-2, loops (66), (68) are formed in succession since the yarn is fed to the needles (h), (H), in FIG. 5-3 loop (70) is formed since the yarn is fed to the needle (I), in FIG. 5-4 loops (72), (74) are formed, and thereafter normal rib loops are formed inward of the knitted fabric. (76) is cross-over yarn for connecting loops (64), (66), (78) is another cross-over yarn connecting loops (70), (72), and (80) is still another cross-over yarn connecting loops (68), (70). Since these cross-over yarns (76), (78) and (80) do not swell beyond the side border of fabric, and further, since there are two cross-over yarns outside of the side border, the fabric's side border is further reinforced.

The loops (62, 64), (68, 70), and (72, 74) knitted in succession on a same needle bed respectively are different in stitch structure from other loops knitted by ordinary rib knitting, where yarn is fed alternately to the needles on the front and back needle beds, such that the adjacent loops are pulled to each other and the inter-wale distance is decreased. Therefore, a fashion line between them and normal rib-knitted loops is formed to afford fine aesthetic appearance.

Figure 7:
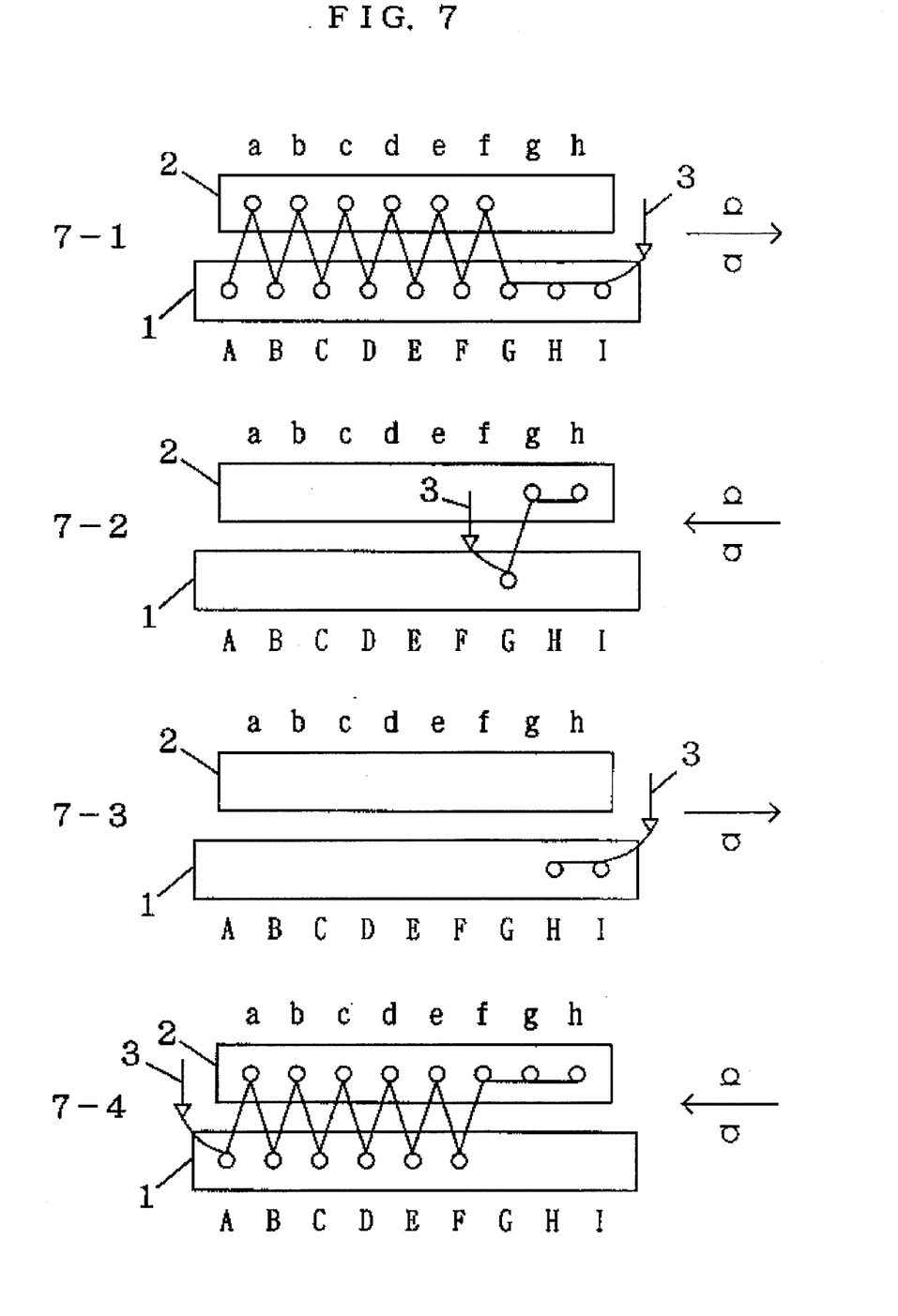
FIG. 7 shows still other knitting courses in a variation of the embodiment shown in FIG. 5.

In the second embodiment, the needle (h) alone was made empty, and a loop was formed by feeding the yarn to the outermost needle (I) on the front needle bed (1) in an order different from normal one as shown in FIG. 5-1. However it is as well possible as shown in FIG. 7-1, that needles (g, h) are taken as empty needles and the order of yarn feeding may be made different from the normal order to the outermost needle (I) and a given number of the adjacent inner needles (one needle (H) in FIG. 7) on the front needle bed (1). When two empty needles (g, h) are provided as shown in FIG. 7, the side border of rib fabric is shown in FIG. 8. The structure of the side border of the rib fabric is similar to that shown in FIG. 6.

Embodiment 3

FIG. 9 shows the knitting courses of the third embodiment, and FIG. 10 shows the resulting knitted fabric. In FIG. 9-1 yarn is fed alternately to the needles (A–H) on the front needle bed (1) and the needles (a–g) on the back needle bed (2) for formation of loops, and the needle (h) is taken as an empty needle. Thus, after the yarn is fed to the needle (H) on the front needle bed (1), the yarn is fed to the needle (I) on the same needle bed (1) in succession for loop formation. Then, as shown in FIG. 9-2, the yarn feeder (3) is reversed, and thereafter, the yarn is fed to the empty needle (h) on the back needle bed (2) which was not used in the previous course as well as the adjacent needles (H) on the front needle bed (1) along the direction of the yarn feeder movement for loop formation. In FIG. 9-3, the yarn feeder (3) is reversed and traverses outward of the fabric. In FIG. 9-4, the yarn is fed to the needles (I) and (h) for loop formation, this is followed by alternate yarn feeding to the needles (g–a) on the back needle bed (2) and the needles (G–A) on the front needle bed (1).

The side border of the rib stitch fabric thus knitted is similar to that in FIG. 6, while the loop (70) in FIG. 6 is twisted to a loop (90), and accordingly the cross-over yarns (78), (80) in FIG. 6 are changed to cross-over yarns (92), (94) in FIG. 10. This is because, instead of yarn feeding to the needles (I) in FIG. 5-3, yarn feeding to the needles (I) is here done in FIG. 9-4. The cross-over yarn (94) between the loops (68) and (70) does not swell to the side border of the fabric and, likewise, cross-over yarns (76), (92) do not cause to swell to the side border of the fabric. The loops (64), (90) formed on the front needle bed (1) are caused to be linked with loops (66), (72) formed on the back needle bed (2) through cross-over yarns (76), (92) in the outermost region of the rib fabric, and the fabric's side border is reinforced.

Further, the loops (62, 64), (68, 90) knitted continuously on the front needle bed (1) and the loops (72), (74) knitted also continuously on the back needle bed (2) are different from ordinary rib stitches in knitting structure. In these parts, the adjacent loops are pulled together, and the inter-wale distance gets smaller. Hence, between these wales and ordinarily knitted other wales is generated a fashion line, which adds an aesthetically fine appearance.

Although in the aforementioned embodiments, knitting along the right side border of a fabric is described, however, this method is as well applicable to knitting along the left side border. In each embodiment, the entire region of the fabric is assumed to be rib-knitted, however, it is also possible to rib knit a front placket and to plain knit the rest of a front body to thus mix rib stitches and other stitches in the same course.

What is claimed is:

1. A rib knitting method for knitting a fabric at least one side border, using a flat knitting machine having at least a pair of opposed needle beds, each having a plurality of needles thereon, and at least one yarn feeder which moves on the needle beds for feeding yarn to the plurality of needles thereon, by feeding the yarn alternately to each needle of the plurality of needles on the needle beds corresponding to the fabric, said rib knitting method comprising the steps of:

a) knitting, during movement of the at least one yarn feeder from a first region corresponding to a knitting region of the fabric to be knitted to a second region corresponding to a region outside of the first region, said knitting including feeding the yarn alternately to the needles corresponding to the fabric on a first needle bed of the pair of needle beds and to the needles corresponding to fabric on a second needle bed of the pair of needle beds from the yarn feeder, without feeding at least one needle that is to be taken as an empty needle, said empty needle comprising at least an outermost needle with respect to either needle bed among the needles corresponding to the fabric;

b) moving the yarn feeder from the second region into the first region, thereby forming at least a loop by feeding the yarn to the empty needle;

c) moving the yarn feeder from the first region to the second region; and d) moving the yarn feeder from the second region to the first region, thereby feeding the yarn from the yarn feeder to the needles on the first needle bed and to the needles on the second needle bed corresponding to the fabric for rib knitting during this movement.

2. A rib knitting method according to claim 1, wherein said empty needle consists of an outermost needle.

3. A rib knitting method according to claim 1, wherein said empty needle is a first empty needle which comprises the outermost needle on either needle bed, and wherein at least one second empty needle is provided inside of and adjacent to said first empty needle on a same needle bed.

4. A rib knitting method according to claim 1, wherein the outermost needle on the first needle bed is arranged outside of the outermost needle on the second needle bed, and wherein said empty needle comprises the outermost needle on the first needle bed.

5. A rib knitting method according to claim 1, wherein the outermost needle on the first needle bed is arranged outside of the outermost needle on the second needle bed, and wherein said empty needle is at least the outermost needle corresponding to the fabric on the second needle bed, and wherein in said step "a", the yarn is fed to all of the needles corresponding to the fabric except the empty needle, wherein, in said step "b", after feeding the yarn to said empty needle, feeding the yarn to a first needle of said plurality of needles which is inside of and nearest to a second needle which was last fed during prior feeding on the first needle bed, wherein, in said step "c", the yarn is fed to a third needle corresponding to the fabric outside of and nearest to the first needle on the first needle bed (1), and wherein, in said step "d", after feeding the yarn to said empty needle, feeding the yarn from a fourth needle inside of the third needle on the second needle bed, to needles corresponding to the fabric on the second needle bed and needles corresponding to the fabric on the first needle bed alternately for rib knitting.

6. A rib knitting method according to claim 1, wherein the outermost needle of the needles corresponding to the fabric on the first needle bed is arranged outside of the outermost needle of the needles corresponding to the fabric on the second needle bed, wherein said empty needle is at least the outermost needle of the needles corresponding to the fabric on the second needle bed, wherein, in said step "a", the yarn is fed to all needles except said empty needle, wherein, in said step "b", after feeding the yarn to said empty needle, the yarn is fed to a first needle on the first needle bed nearest to and inside of said empty needle, and wherein, in said step "d", after feeding the yarn to the outermost needle on the needles corresponding to the fabric on the first needle bed and said empty needle, the yarn is fed from a second needle inside of the empty needle on the second needle bed alternately to all needles corresponding to the fabric on the second needle bed and all needles corresponding to the fabric on the first needle bed (1).

* * * * *